United States Patent
Brittain et al.

(10) Patent No.: US 6,774,303 B1
(45) Date of Patent: Aug. 10, 2004

(54) CLAMP FOR A VIBRATION DAMPER AND METHOD OF INSTALLING SAME

(75) Inventors: Carl C. Brittain, Dewey, AZ (US); Mark E. Orth, Phoenix, AZ (US); Wayne D. Wilcoxon, Peoria, AZ (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 0 days.

(21) Appl. No.: 10/356,086

(22) Filed: Jan. 30, 2003

(51) Int. Cl.[7] .................................................. H02G 7/14
(52) U.S. Cl. ........................ 174/42; 174/40 R; 174/68.1
(58) Field of Search ................................ 174/42, 40 R, 174/68.1

(56) References Cited

U.S. PATENT DOCUMENTS

| | | | | |
|---|---|---|---|---|
| 3,432,610 A | * | 3/1969 | Claren ........................ | 174/42 |
| 3,446,907 A | | 5/1969 | Bouche | |
| 3,584,133 A | * | 6/1971 | Claren ........................ | 174/42 |
| 3,597,522 A | | 8/1971 | Kobayaski | |
| 3,666,311 A | | 5/1972 | McMullin | |
| 3,992,566 A | | 11/1976 | Kerimov et al. | |
| 4,011,397 A | * | 3/1977 | Bouche ........................ | 174/42 |
| 4,110,553 A | * | 8/1978 | Hawkins et al. ............... | 174/42 |
| 4,167,646 A | | 9/1979 | Mathieu | |
| 4,209,659 A | * | 6/1980 | Hawkins ....................... | 174/42 |
| 4,259,541 A | * | 3/1981 | Bouche ........................ | 174/42 |
| 4,527,008 A | * | 7/1985 | Hawkins et al. ............... | 174/42 |
| 4,527,009 A | * | 7/1985 | Hawkins ....................... | 174/42 |
| 4,554,402 A | * | 11/1985 | Hawkins et al. ............... | 174/42 |
| 4,680,424 A | * | 7/1987 | Hawkins ....................... | 174/42 |
| D293,701 S | | 1/1988 | Baum | |
| 5,801,329 A | | 9/1998 | Schmidt | |
| 5,936,197 A | * | 8/1999 | Katoh et al. ............. | 174/40 CC |

OTHER PUBLICATIONS

A Technical Discussion of Advanced Damper Application.—The Fargo 4–R, Technical Bulletin—Apr., 1997.

* cited by examiner

Primary Examiner—Dean A. Reichard
Assistant Examiner—Jinhee Lee
(74) Attorney, Agent, or Firm—Lowell W. Gresham; Jordan M. Meschkow; Meschkow & Gresham PLC

(57) ABSTRACT

A clamp (40) for attaching a vibration damper to an energized suspended conductor (98) includes a base (42) having a first clamp member (46) with first and second extension sections (50, 52). The clamp (40) further includes a second clamp member (56) positioned between the extension sections (50, 52), and an eyebolt (58) for securing the second clamp member (56), to the first clamp member (46). The extension sections (50, 52) continuously abut the second clamp member (56) to prevent its rotation about the eyebolt (58). During installation, the eyebolt (58) is captured by a hook member (92) of shotgun stick (94) and a single lineman secures the vibration damper to the conductor (98).

30 Claims, 3 Drawing Sheets

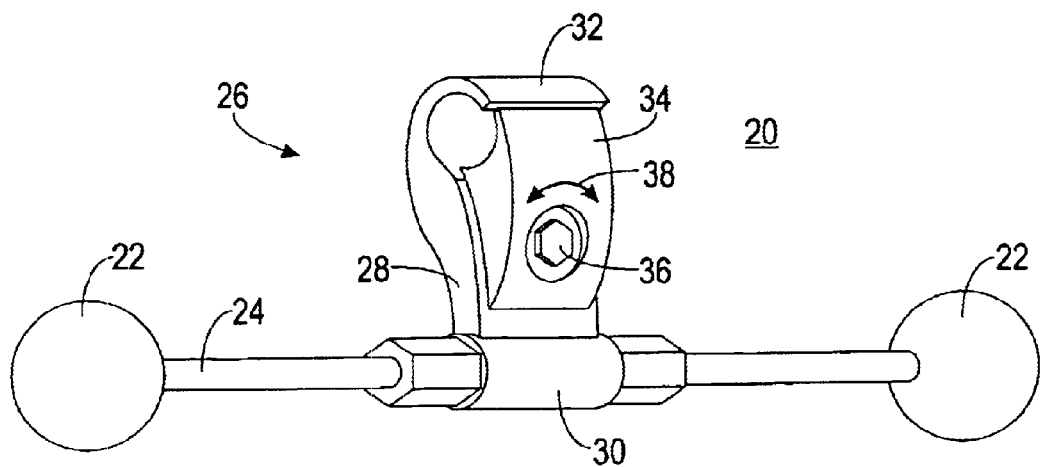
PRIOR ART  FIG. 1
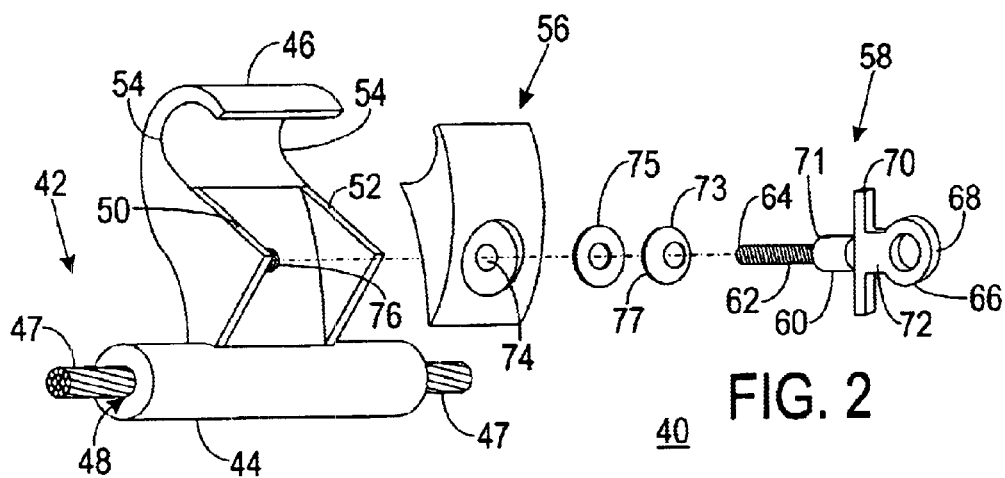
FIG. 2
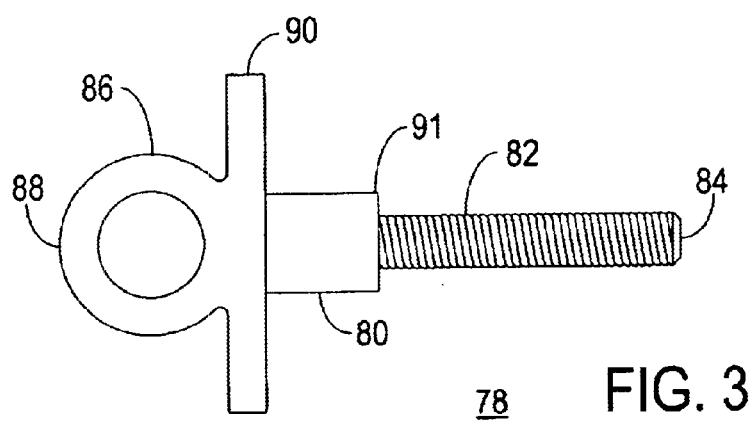
FIG. 3

CLAMP FOR A VIBRATION DAMPER AND METHOD OF INSTALLING SAME

TECHNICAL FIELD OF THE INVENTION

The present invention relates to the field of electrical conductor cables. More specifically, the present invention relates to vibration dampers for limiting wind-induced vibration of the conductor cables.

BACKGROUND OF THE INVENTION

Electrical conductor cables suspended overhead from poles and/or towers are subject to a wind induced vibration identified as aeolian vibration. A typical overhead conductor for high voltage transmission of electrical power is comprised of a multi-strand conductor. Even though the amplitude or intensity of aeolian vibration is small (rarely more than the diameter of the conductor when measured from peak to peak), the effect of such a vibration is to cause the conductor strands and/or conductor supports to fail in fatigue.

One method of combating wind induced vibration is by the use of damping devices, one being the well-known Stockbridge damper. The Stockbridge damper includes a symmetrical arrangement of weights and messenger cable clamped to the electrical conductor. The function of the Stockbridge damper is to transform the vibratory motion of the conductor into another form of energy, namely, heat from friction between the strands of the messenger cable, and dissipate this heat to the atmosphere.

Vibration dampers are typically installed on electrical conductors during new construction when the electrical conductors are not yet energized. During new construction, a vibration damper can be easily installed on a conductor by hand by mounting a conductor clamp of the vibration damper onto the conductor. A capscrew on the conductor clamp is then tightened using a hand-held wrench or socket wrench to secure the vibration damper onto the conductor.

Occasionally, it is desirable to add vibration dampers on existing construction in which the electrical conductors are already energized. For example, in areas where conductor and/or support hardware failures have occurred due to wind-induced vibration, corrective action may be required to prevent additional component failures. The method of installation of vibration dampers utilized during new construction often cannot be employed on existing construction without taking a planned power outage. That is, the energized conductors must be de-energized before a lineman can install the vibration dampers onto the existing electrical conductors.

Obviously, de-energizing conductors even for a short duration is an unsatisfactory situation. Power outages, planned or otherwise, are inconvenient, disrupting the operation of electrically-powered heating and air conditioning systems, mass transportation systems, appliances, computing systems, and so forth. Moreover, a power outage that disrupts the operation of traffic signals, hospital equipment, and so forth can endanger lives. Accordingly, it is highly desirable that electrical conductors remain energized when installing vibration dampers on existing construction.

Working on energized electrical conductors, such as high voltage power lines, is hazardous. Service personnel for power companies typically utilize apparatuses referred to as live line tools, such as, hot sticks, shotgun sticks, gripall sticks, or clamp sticks, when working on electrical conductors or for manipulating various other tools that contact the electrical conductors. A hot stick provides electrical insulation for a lineman and allows a lineman to maintain a safe working clearance from the energized conductor.

FIG. 1 shows a perspective view of a prior art Stockbridge-type vibration damper 20. Damper 20 includes weights 22, a messenger cable 24, and a clamp 26. Clamp 26 includes a base 28 having a cable housing 30 for attachment to messenger cable 24 and a first clamp member 32. Clamp 26 further includes a second clamp member 34. A capscrew 36 secures second clamp member 34 to first clamp member 32.

A common method used to install vibration damper 20 on an energized conductor involves utilization of a first hot stick by a first lineman to hold vibration damper 20 by messenger cable 24 and position it on the conductor, maintaining a downward force on the first hot stick. To facilitate installation, capscrew 36 must be retracted far enough to allow the conductor to fit between first clamp member 32 and second clamp member 34. Unfortunately, if second clamp member 34 is bumped slightly, second clamp member 34 can rotate about capscrew 36 as represented by an arrow 38. Consequently, once clamp 26 is positioned on the energized conductor, a second lineman using a second hot stick with a socket on the end captures capscrew 36 and alternately tightens capscrew 36 and moves second clamp member 34 back to its original position, potentially requiring the use of a third hot stick.

Accordingly, installation of the vibration dampers on energized conductors requires two lineman manipulating two or more hot sticks, and potentially two pieces of equipment, typically referred to as cherry pickers, each having a maneuverable vertical boom with an open bucket at the end from which the lineman can perform the installation. Bucket repositioning may or may not be required during the installation to ensure that adequate leverage can be maintained to perform the tasks while maintaining appropriate clearances between the linemen and the energized conductor.

A typical vibration damper weighs approximately six to twelve pounds. When a lineman is working on a suspended conductor, the conductor may be as much as twelve feet from the lineman. Thus, a lineman may utilize a hot stick of approximately twelve feet in length in order to reach the conductor. Experience has shown that the installation of a vibration damper on an energized conductor takes two experienced linemen approximately ten to fifteen minutes per damper installation. The weight of the vibration damper, supported on an end of the hot stick remote from the lineman, is unwieldy, thus requiring significant strength to support the vibration damper for such a duration.

Moreover, the duration combined with the use of two linemen for each installation significantly drives up the cost of each installation. Thus, what is needed is mechanism and method for rapidly installing a vibration damper utilizing a single lineman.

SUMMARY OF THE INVENTION

Accordingly, it is an advantage of the present invention that a clamp for a vibration damper and a method for installing the vibration damper is provided.

Another advantage of the present invention is that a clamp is provided that is resistant to rotation during installation.

It is another advantage of the present invention that a clamp for a vibration damper is provided that enables a single lineman to install the vibration damper.

Yet another advantage of the present invention is that the clamp enables the vibration damper to be rapidly installed on an energized conductor using a single live line tool.

The above and other advantages of the present invention are carried out in one form in a vibration damper by a clamp for attachment to a suspended conductor, the vibration damper including a damping structure. The clamp includes a base having a housing for attachment to the damping structure and a first clamp member extending from the housing. The first clamp member has a first extension section and a second extension section. A second clamp member is positioned between the first and second extension sections. The first and second clamp members cooperate to provide a passageway for the suspended conductor. A fastener secures the second clamp member to the first clamp member, and the first and second extension sections continuously abut the second clamp member to prevent rotation of the second clamp member about the fastener.

The above and other advantages of the present invention are carried out in another form by a method for installing a vibration damper on an energized suspended cable using a shotgun stick. The vibration damper includes a clamp for attachment to the suspended conductor, the clamp including a first clamp member, a second clamp member, and an eyebolt for securing the second clamp member to the first clamp member. The method calls for directing the eyebolt through the second clamp member and into a receiving portion of the first clamp member to secure the second clamp member to the first clamp member in a loosened configuration. The method further calls for capturing a loop portion of the eyebolt by a hook member slidably mounted within a head of the shotgun stick. The vibration damper is manipulated by the loop portion of the eyebolt using the shotgun stick. The manipulating operation enables passage of the energized suspended conductor in a passageway formed between the first and second clamp members. The shotgun stick is rotated to impart rotational motion on the eyebolt to engage a threaded portion of the eyebolt with the receiving portion of the first clamp member to retain the clamp on the energized suspended conductor. The loop portion of the eyebolt is then released from the hook member.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a perspective view of a prior art Stockbridge-type vibration damper;

FIG. 2 shows an exploded perspective view of a clamp for a vibration damper in accordance with a preferred embodiment of the present invention;

FIG. 3 shows a front view of an eyebolt for the clamp of FIG. 2 in accordance with an alternative embodiment of the present invention;

DETAILED DESCRIPTION OF THE PREFERRED EMBODIMENTS

Figure 4:
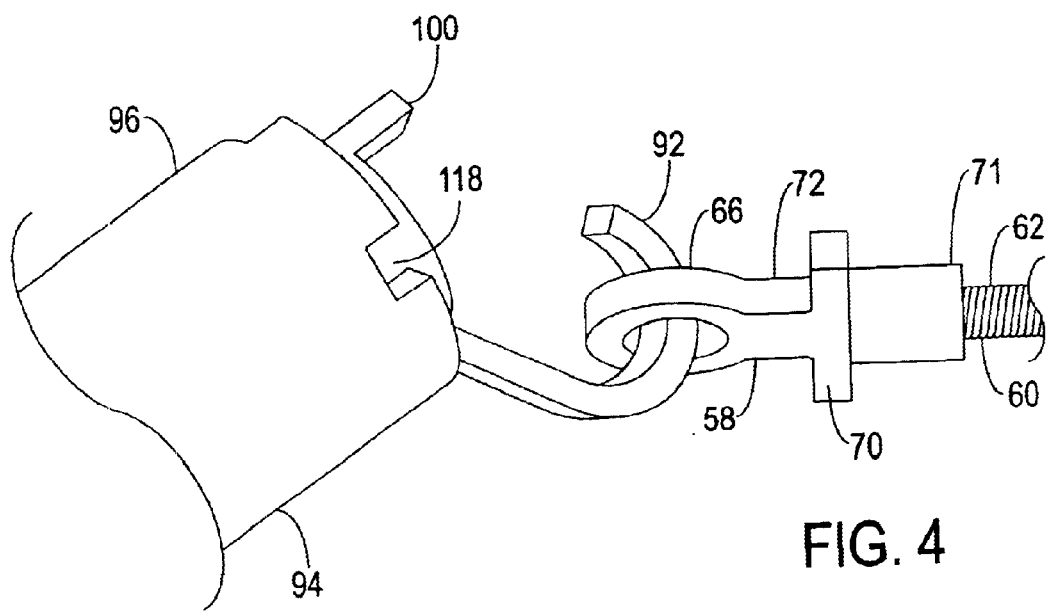
FIG. 4 shows a partial perspective view of hook member of a shotgun stick capturing an eyebolt of the clamp of FIG. 2.

The present invention entails a clamp for a vibration damper and a method for installing the vibration damper that can be performed by a single lineman utilizing a conventional shotgun stick. The vibration damper can be advantageously installed on an energized electrical conductor on existing construction.

FIG. 2 shows an exploded perspective view of a clamp 40 for a vibration damper in accordance with a preferred embodiment of the present invention. Clamp 40 includes a base 42 having a housing 44 and a first clamp member 46 extending therefrom. Housing 44 is adapted for attachment to a damping structure 47. For example, housing 44 includes a bore 48 through which a portion of damping structure 47 can be directed. First clamp member 46 includes a first extension section 50 and a second extension section 52. First and second extension sections 50 and 52, respectively, project from outer edges 54 of first clamp member 46.

In an exemplary embodiment, damping structure 47 may be an arrangement of weights and a messenger cable, which are to be clamped to the electrical conductor. Such damping structures are sometimes referred to as a Stockbridge-type vibration dampers. However, the present invention is not limited for use with Stockbridge vibration dampers. Nor is the present invention limited for use with damping structures having a cable element that attaches to clamp 40. Rather, clamp 40 may be adapted for use with other styles of vibration damping structures that are to be secured to suspended electrical conductors.

Clamp 40 further includes a second clamp member 56 configured to be positioned between first and second extension sections 50 and 52, respectively. A fastener, in the form of an eyebolt 58, secures second clamp member 56 to first clamp member 46. When second clamp member 56 is coupled to first clamp member 46, first and second extension sections 50 and 52 continuously abut second clamp member 56 to prevent rotation of second clamp member 56 about eyebolt 58.

Eyebolt 58 includes a shaft 60 having a threaded portion 62 located at a first shaft end 64 and a loop portion 66 located at a second shaft end 68. A cruciform shoulder 70 is positioned between threaded portion 62 and loop portion 66 and is oriented substantially perpendicular to shaft 60. A stop section 71 extends between threaded portion 62 and shoulder 70, and has a diameter greater than the diameter of threaded portion 62. In addition, an elongate shaft section 72 extends between shoulder 70 and loop portion 66.

A tension retainer is disposed on shaft 60. In a preferred embodiment, the tension retainer includes a coned disk spring 73, alternatively known as a spring washer, accompanied by a flat washer 75. Disk spring 73 is disposed on threaded portion 62 of shaft 60 such that a cup 77 of disk spring 73 points toward second clamp member 56. Flat washer 75 is subsequently disposed on shaft 60 between disk spring 73 and second clamp member 56.

One exemplary disk spring 73 is a Belleville washer, manufactured by KEY BELLEVILLE, INC., Leechburg, Pa. 15656-9531, USA. A Belleville washer is a compact type of spring in the shape of a washer that has been pressed into a dished shape and then hardened and tempered. A Belleville washer compresses as pressure is applied to it. Disk spring 73 is sized such that it is fully compressed at proper torque. Accordingly, disk spring 73 is used to maintain the load between eyebolt 58 and second clamp member 56 in order to keep the bolted connection tight.

Belleville washers are preferred in the present invention to apply a load upon a surface of second clamp member 56, and to provide some vibration absorption. In addition, Belleville washers are simple in their operation and provide an inexpensive and compact springing solution. However, those skilled in the art will recognize that alternative tension retainers may be employed such as, a spring or a spring lock washer accompanied by a flat washer.

To assemble clamp 40, disk spring 73 and flat washer 75 are disposed on threaded portion 62 of eyebolt 58. Threaded portion 62 of eyebolt 58 is then directed through an aperture 74 in second clamp member 56, and threaded into a corresponding receiving portion 76 of first clamp member 46. Loop portion 66 is configured for engagement with an installation tool, with shoulder 70 being configured for retention in a detent within the head of the installation tool, discussed in detail in connection with FIGS. 4–6.

FIG. 3 shows a front view of an eyebolt 78 for clamp 40 (FIG. 2) in accordance with an alternative embodiment of the present invention. That is, eyebolt 78 may be optionally employed in place of eyebolt 58 (FIG. 2). Like eyebolt 58, eyebolt 78 includes a shaft 80 having a threaded portion 82 located at a first shaft end 84 and a loop portion 86 located at a second shaft end 88. A shoulder 90 is positioned between threaded portion 82 and loop portion 86 and is oriented substantially perpendicular to shaft 80, and a stop section 91 extends between shoulder 90 and threaded portion 82. However, unlike eyebolt 58, shoulder 90 of eyebolt 78 is adjacent loop portion 86.

Figure 5:
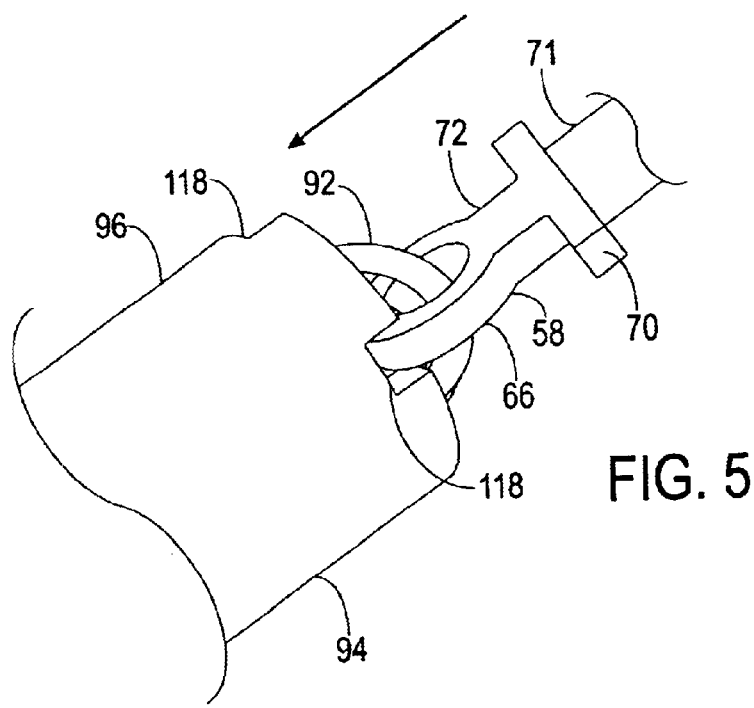
FIG. 5 shows a partial perspective view of the hook member and eyebolt of FIG. 4 being retracted into a head of the shotgun stick.
Figure 6:
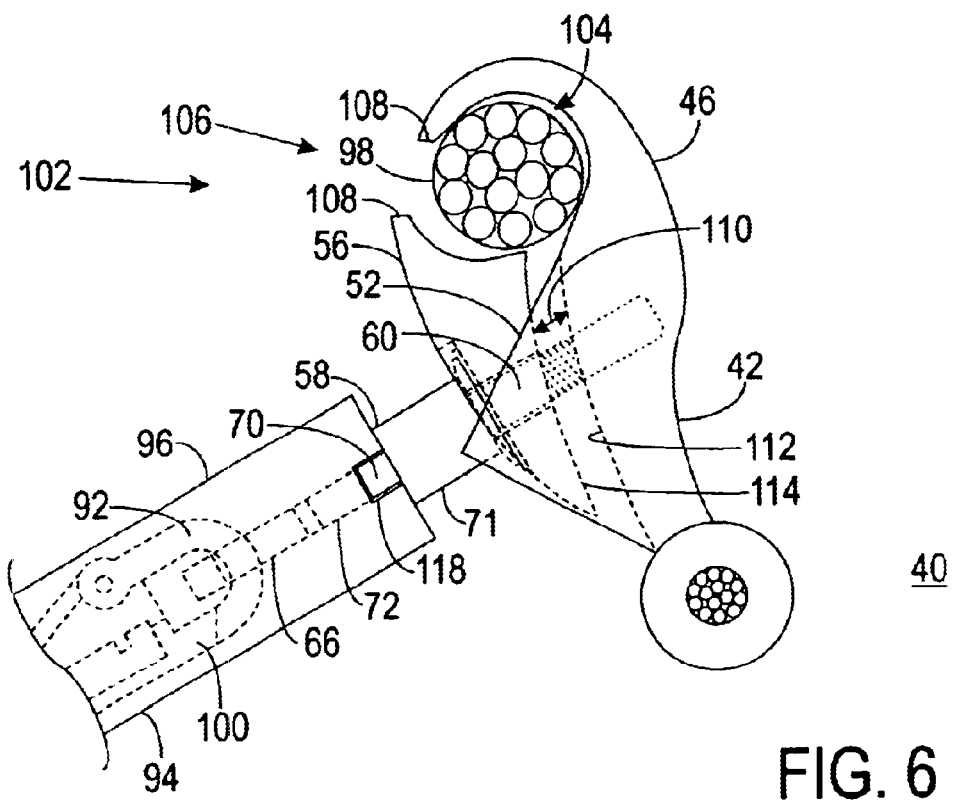
FIG. 6 shows a partial side view of the clamp of FIG. 2 being secured to an energized electrical conductor using the shotgun stick.

Referring to FIGS. 4–6, FIG. 4 shows a partial perspective view of a hook member 92 of a shotgun stick 94 capturing eyebolt 58. FIG. 5 shows a partial perspective view of hook member 92 and eyebolt 58 being retracted into a head 96 of shotgun stick 94. FIG. 6 shows a partial side view of clamp 40 being secured to an energized suspended electrical conductor 98 using shotgun stick 94.

FIGS. 4–5 show eyebolt 58 without base 42 and second clamp member 56 for simplicity of illustration. However, FIG. 6 includes base 42 and second clamp member 56 to illustrate the interaction of base 42, second clamp member 56, and eyebolt 58 to retain suspended conductor 98. Thus, FIGS. 4–6 collectively illustrate an installation procedure performed by a single lineman using a conventional shotgun stick, such as that manufactured by Hastings Fiber Glass Products, Inc., Hastings, Mich., a gripall stick manufactured by A. B. Chance Company, a subsidiary of Hubbell Incorporated, Centralia, Mo. or other live line tools having similar actuation mechanisms.

Per convention, shotgun stick 94 includes an elongated support rod assembly (not shown) with head 96 mounted on one end thereof and a handle assembly (not shown) mounted thereon adjacent the other end. Hook member 92 is slidably mounted in head 96 and is actuated by an operating rod (not shown) which is connected between hook member 92 and the handle assembly. Thus, hook member 92 may be extended from or retracted into head 96. When hook member 92 is extended from head 96, a conventional tension spring causes hook member 92 to pivotally swing into an open position, as shown in FIG. 4. Hook member 92 is further designed to coact with a projection 100, which extends from head 96. When hook member 92 is retracted axially inwardly from the FIG. 4 position, hook member 92 pivotally swings into a closed position on top of projection 100 to form a substantially closed loop, as shown in FIG. 5.

A procedure for installing a vibration damper that includes clamp 40 onto energized suspended conductor 98 entails directing eyebolt 58 through aperture 74 (FIG. 2) of second clamp member 56 and into receiving portion 76 (FIG. 2) of first clamp member 46 of base 42. In particular, second clamp member 56 is secured to first clamp member 46 in a loosened configuration 102. Loosened configuration 102 is particularly illustrated in FIG. 6.

First and second clamp members 46 and 56, respectively, function cooperatively to provide a passageway 104 for suspended conductor 98. Accordingly, in loosened configuration 102, a slot 106 is formed between upper edges 108 of each of first and second clamp members 46 and 56, respectively. As further shown in FIG. 6, in loosened configuration 102, a gap 110 is formed between a first inner surface 112 of first clamp member 46 and a second inner surface 114 of second clamp member 56.

First and second extension members 50 and 52, respectively, extend in a direction transverse to a longitudinal axis 116 (see FIG. 7) of passageway 104. In addition, first and second extension members 50 and 52 project a distance 117 (see FIG. 7) from first clamp member 46 that is greater than a maximum width of gap 110. Accordingly, when clamp 40 is in loosened configuration 102, first and second extension members 50 and 52 still abut second clamp member 56 to prevent the rotation of second clamp member 56 about shaft 60 of eyebolt 58.

Next, a lineman extends hook member 92 from shotgun stick 94 and hooks loop portion 66 of eyebolt 58 with hook member 92. Hook member 92 and loop portion 66 are then retracted into head 96 of shotgun stick 94 so that loop portion 66 is captured in head 96. This retraction enables shoulder 70 of eyebolt 58 to be pulled toward head 96 and seat in a detent 118 on the end of head 96. The presence of elongate shaft section 72 enables eyebolt 58 to be drawn deeply into head 96 before shoulder 70 is seated in detent 118 so as to provide more support for eyebolt 58 as eyebolt 58 is rotated. However, when a cavity in head 96 is too shallow, eyebolt 78 (FIG. 3) may be alternatively utilized.

Once captured, the lineman can manipulate the vibration damper by loop portion 66 of eyebolt 58 using shotgun stick 94. In particular, the lineman lifts up the vibration damper using shotgun stick 94 and positions clamp 40 to enable passage of suspended conductor 98 through slot 106 and into passageway 104.

Following the positioning of suspended conductor 98 in passageway 104, the lineman rotates shotgun stick 94. Rotation of shotgun stick 94 imparts rotational motion on shaft 60 and shoulder 70 of eyebolt 58. Eyebolt 58 is rotated until flat washer 75, followed by disk spring 73 and stop section 71, snugly abut the outer surface of second clamp member 56, so that threaded portion 62 of eyebolt 58 is securely engaged with receiving portion 76 of first clamp member 46. Shoulder 70 advantageously pushes against the side walls of detent 118 thereby enabling greater torque to be applied to eyebolt 58. Accordingly, eyebolt 58 secures second clamp member 56 to first clamp member 46 so that clamp 40 is secured to conductor 98 by closing gaps 104 and 110. Once secured, the lineman extends hook member 92 from head 96 so that hook member 92 pivotally swings to the open position. Loop portion 66 of eyebolt 58 is then released from hook member 92.

Figure 7:
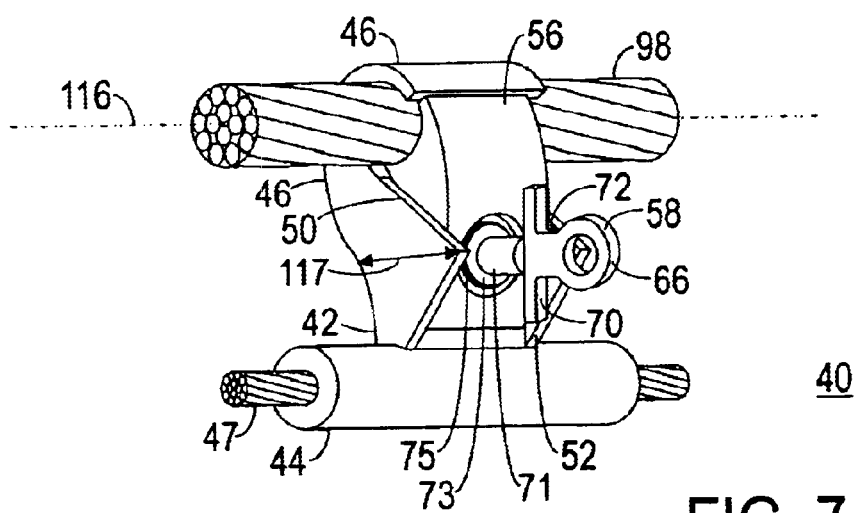
FIG. 7 shows a perspective view of the clamp of the vibration damper installed on the energized electrical conductor.

FIG. 7 shows a perspective view of clamp 40 of the vibration damper installed on energized electrical conductor 98. Damping structure 47 of the vibration damper is retained in housing 44 of base 42. As shown, second clamp member 56 is positioned between first and second extensions 50 and 52, respectively. In addition, eyebolt 58 is directed through second clamp member 56 and into first clamp member 46, thus securing clamp 40 in a tightened configuration so that conductor 98 is retained between first and second clamp members 46 and 56, respectively.

Through experimentation, it has been observed that a single lineman can install a vibration damper having clamp 40 on energized conductor 98 in less than one minute. In addition, the torque applied to eyebolt 58 was found to be 20–25 ft-lb, which is the same as applied when installing without a hot stick using a socket and ratchet. Accordingly, the present invention yields a significant improvement over prior art methods that took approximately ten to fifteen minutes per installation and required two linemen utilizing two or more hot sticks.

In summary, the present invention teaches of a clamp for a vibration damper and a method for installing the vibration damper. The base of the clamp includes a first clamp member having extensions that substantially prevent the corresponding second clamp member from rotating about the fastener. In addition, the fastener is an eyebolt having a loop portion that is readily captured by the hook member of a shotgun stick. The combination of the extensions and the eyebolt enables a single lineman to rapidly install a vibration damper on an energized conductor with the use of a conventional shotgun stick. In addition, a safe working clearance is maintained with the shotgun stick.

Although the preferred embodiments of the invention have been illustrated and described in detail, it will be readily apparent to those skilled in the art that various modifications may be made therein without departing from the spirit of the invention or from the scope of the appended claims. For example, when the head of shotgun stick does not include a detent, the shoulder on the eyebolt of the present invention may be optionally omitted.

What is claimed is:

1. In a vibration damper, a clamp for attachment to a suspended conductor, said vibration damper including a damping structure, and said clamp comprising:
    a base having a housing for attachment to said damping structure and a first clamp member extending from said housing, said first clamp member having a first extension section and a second extension section;
    a second clamp member positioned between said first and second extension sections, said first and second clamp members cooperating to provide a passageway for said suspended conductor; and
    an eyebolt for securing said second clamp member to said first clamp member, said first and second extension sections continuously abutting said second clamp member to prevent rotation of said second clamp member about said eyebolt, and said eyebolt including a shaft having a first shaft end and a second shaft end, a threaded portion being located at said first shaft end for interconnection with said first and second clamp members, and a loop portion located at said second shaft end for engagement with an installation tool for said vibration damper, said eyebolt further including a shoulder positioned between said threaded portion and said loop portion of said shaft and oriented substantially perpendicular to said shaft.

2. A clamp as claimed in claim 1 wherein said eyebolt further comprises an elongate shaft section extending between said shoulder and said loop portion.

3. In a vibration damper, a clamp for attachment to a suspended conductor, said vibration damper including a damping structure, and said clamp comprising:
    a base having a housing for attachment to said damping structure and a first clamp member extending from said housing, said first clamp member having a first extension section and a second extension section;
    a second clamp member positioned between said first and second extension sections, said first and second clamp members cooperating to provide a passageway for said suspended conductor; and
    an eyebolt for securing said second clamp member to said first clamp member, said first and second extension sections continuously abutting said second clamp member to prevent rotation of said second clamp member about said eyebolt, and said eyebolt including a shaft having a first shaft end and a second shaft end, a threaded portion being located at said first shaft end for interconnection with said first and second clamp members, and a loop portion located at said second shaft end for engagement with an installation tool for said vibration damper, said eyebolt further comprising a stop section extending between said threaded portion and said loop portion.

4. In a vibration damper, a clamp for attachment to a suspended conductor, said vibration damper including a damping structure, and said clamp comprising:
    a base having a housing for attachment to said damping structure and a first clamp member extending from said housing, said first clamp member having a first extension section and a second extension section;
    a second clamp member positioned between said first and second extension sections, said first and second clamp members cooperating to provide a passageway for said suspended conductor;
    an eyebolt for securing said second clamp member to said first clamp member, said first and second extension sections continuously abutting said second clamp member to prevent rotation of said second clamp member about said eyebolt, and said eyebolt including a shaft having a first shaft end and a second shaft end, a threaded portion being located at said first shaft end for interconnection with said first and second clamp members, and a loop portion being located at said second shaft end for engagement with an installation tool for said vibration damper; and
    a tension retainer disposed on said shaft and interposed between said second clamp member and a stop section of said eyebolt.

5. A clamp as claimed in claim 4 wherein said tension retainer comprises a coned disk spring.

6. In a vibration damper, a clamp for attachment to a suspended conductor, said vibration damper including a damping structure, and said vibration damper being installable by an installation tool comprising: wherein said installation tool having a hook member slidably mounted within a head of said installation tool for extension from and retraction into said head, and said clamp comprising:
    a base having a housing for attachment to said damping structure and a first clamp member extending from said housing, said first clamp member having a first extension section and a second extension section;
    a second clamp member positioned between said first and second extension sections, said first and second clamp members cooperating to provide a passageway for said suspended conductor; and an eyebolt for securing said second clamp member to said first clamp member, said first and second extension sections continuously abutting said second clamp member to prevent rotation of said second clamp member about said eyebolt, and said eyebolt including a shaft having a first shaft end and a second shaft end, a threaded portion being located at said first shaft end for interconnection with said first and second clamp members, and a loop portion being located at said second shaft end for engagement with said installation tool, said loop portion being configured to be captured by said hook member and retracted into said head such that rotation of said installation tool causes rotation of said eyebolt.

7. In a vibration damper having a clamp for attachment to a suspended conductor, said clamp including a first clamp member and a second clamp member, a fastener for securing said second clamp member to said first clamp member, said fastener comprising:
 a shaft having a first shaft end and a second shaft end;
 a threaded portion located at said first shaft end configured for interconnection with said first and second clamp members;
 a loop portion located at said second shaft end for engagement with an installation tool for said vibration damper; and
 a shoulder positioned between said threaded portion and said loop portion of said shaft and oriented substantially perpendicular to said shaft.

8. A fastener as claimed in claim 7 further comprising an elongate shaft section extending between said shoulder and said loop portion.

9. A fastener as claimed in claim 7 further comprising a stop section extending between said threaded portion and said shoulder.

10. In a vibration damper having a clamp for attachment to a suspended conductor, said clamp including a first clamp member and a second clamp member, and said vibration damper being installable by an installation tool comprising: wherein said installation tool having a hook member slidably mounted within a head of said installation tool for extension from and retraction into said head, a fastener for securing said second clamp member to said first clamp member, said fastener comprising:
 a shaft having a first shaft end and a second shaft end;
 a threaded portion located at said first shaft end configured for interconnection with said first and second clamp members; and
 a loop portion located at said second shaft end for engagement with an installation tool for said vibration damper, said loop portion configured to be captured by said hook member and retracted into said head such that rotation of said installation tool causes rotation of said fastener.

11. A method for installing a vibration damper on an energized suspended conductor using a shotgun stick, said vibration damper including a clamp for attachment to said suspended conductor, said clamp including a first clamp member, a second clamp member, and an eyebolt for securing said second clamp member to said first clamp member, said method comprising:
 directing said eyebolt through said second clamp member and into a receiving portion of said first clamp member to secure said second clamp member to said first clamp member in a loosened configuration;
 capturing a loop portion of said eyebolt by a hook member slidably mounted within a head of said shotgun stick;
 manipulating said vibration damper by said loop portion of said eyebolt using said shotgun stick, said manipulating operation enabling passage of said energized suspended conductor in a passageway formed between said first and second clamp members;
 rotating said shotgun stick to impart rotational motion on said eyebolt to engage a threaded portion of said eyebolt with said receiving portion of said first clamp member and retain said clamp on said energized suspended conductor; and
 releasing said loop portion of said eyebolt from said hook member.

12. A method as claimed in claim 11 wherein said hook member is configured for extension from and retraction into said head of said shotgun stick, and said capturing operation comprises retracting said hook member into said head of said shotgun stick to retain said loop portion of said eyebolt inside said shotgun stick.

13. A method as claimed in claim 12 wherein said releasing operation comprises:
 extending said hook member from said head of said shotgun stick to move said loop portion of said eyebolt outside said shotgun stick; and
 uncoupling said hook member from said loop portion of said eyebolt.

14. In a vibration damper, a clamp for attachment to a suspended conductor, said vibration damper including a damping structure, and said clamp comprising:
 a base having a housing for attachment to said damping structure and a first clamp member extending from said housing, said first clamp member having a first extension section and a second extension section;
 a second clamp member positioned between said first and second extension sections, said first and second clamp members cooperating to provide a passageway for said suspended conductor; and
 an eyebolt for securing said second clamp member to said first clamp member, said first and second extension sections continuously abutting said second clamp member to prevent rotation of said second clamp member about said eyebolt, and said eyebolt including:
  a shaft having a first shaft end and a second shaft end;
  a threaded portion located at said first shaft end configured for interconnection with said first and second clamp members; and
  a loop portion located at said second shaft end for engagement with an installation tool for said vibration damper.

15. A clamp as claimed in claim 14 wherein said first and second extension sections project a distance from said first clamp member, said distance being greater than a maximum gap width between a first inner surface of said first clamp member and a second inner surface of said second clamp member.

16. A clamp as claimed in claim 14 wherein said eyebolt further comprises a shoulder positioned between said threaded end and said loop portion of said shaft and oriented substantially perpendicular to said shaft.

17. A clamp as claimed in claim 16 wherein said eyebolt further comprises an elongate shaft section extending between said shoulder and said loop portion.

18. A clamp as claimed in claim 16 wherein said eyebolt further comprises a stop section extending between said threaded end and said shoulder.

19. A clamp as claimed in claim 14 wherein said installation tool has a hook member slidably mounted within a head of said installation tool for extension from and retraction into said head, and said loop portion is configured to be captured by said hook member and retracted into said head such that rotation of said installation tool causes rotation of said eyebolt.

20. In a vibration damper, a clamp for attachment to a suspended conductor, said vibration damper including a damping structure, and said clamp comprising:
- a base having a housing for attachment to said damping structure and a first clamp member extending from said housing;
- a second clamp member, said first and second clamp members cooperating to provide a passageway for said suspended conductor, and one of said first and second clamp members including an extension section; and
- an eyebolt for securing said second clamp member to said first clamp member, said extension section preventing rotation of said second clamp member about said eyebolt, said eyebolt including a shaft having a first shaft end and a second shaft end, a threaded portion being located at said first shaft end for interconnection with said first and second clamp members, and a loop portion being located at said second shaft end for engagement with an installation tool for said vibration damper, said eyebolt further including a shoulder positioned between said threaded portion and said loop portion of said shaft and oriented substantially perpendicular to said shaft.

21. A clamp as claimed in claim 20 wherein said eyebolt further comprises an elongate shaft section extending between said shoulder and said loop portion.

22. In a vibration damper, a clamp for attachment to a suspended conductor, said vibration damper including a damping structure, and said clamp comprising:
- a base having a housing for attachment to said damping structure and a first clamp member extending from said housing;
- a second clamp member, said first and second clamp members cooperating to provide a passageway for said suspended conductor, and one of said first and second clamp members including an extension section; and
- an eyebolt for securing said second clamp member to said first clamp member, said extension section preventing rotation of said second clamp member about said eyebolt, said eyebolt including a shaft having a first shaft end and a second shaft end, a threaded portion being located at said first shaft end for interconnection with said first and second clamp members, and a loop portion being located at said second shaft end for engagement with an installation tool for said vibration damper, and said eyebolt further comprising a stop section extending between said threaded portion and said loop portion.

23. In a vibration damper, a clamp for attachment to a suspended conductor, said vibration damper including a damping structure, and said clamp comprising:
- a base having a housing for attachment to said damping structure and a first clamp member extending from said housing;
- a second clamp member, said first and second clamp members cooperating to provide a passageway for said suspended conductor, and one of said first and second clamp members including an extension section;
- an eyebolt for securing said second clamp member to said first clamp member, said extension section preventing rotation of said second clamp member about said eyebolt, said eyebolt including a shaft having a first shaft end and a second shaft end, a threaded portion being located at said first shaft end for interconnection with said first and second clamp members, and a loop portion being located at said second shaft end for engagement with an installation tool for said vibration damper; and
- a tension retainer disposed on said shaft and interposed between said second clamp member and a stop section of said eyebolt.

24. A clamp as claimed in claim 23 wherein said tension retainer comprises a coned disk spring.

25. In a vibration damper, a clamp for attachment to a suspended conductor, said vibration damper including a damping structure, and said vibration damper being installable by an installation tool comprising: wherein said installation tool having a hook member slidably mounted within a head of said installation tool for extension from and retraction into said head, and said clamp comprising:
- a base having a housing for attachment to said damping structure and a first clamp member extending from said housing;
- a second clamp member, said first and second clamp members cooperating to provide a passageway for said suspended conductor, and one of said first and second clamp members including an extension section; and
- an eyebolt for securing said second clamp member to said first clamp member, said extension section preventing rotation of said second clamp member about said eyebolt, said eyebolt including a shaft having a first shaft end and a second shaft end, a threaded portion being located at said first shaft end for interconnection with said first and second clamp members, and a loop portion being located at said second shaft end, said loop portion configured to be captured by said hook member and retracted into said head such that rotation of said installation tool causes rotation of said eyebolt.

26. In a vibration damper, a clamp for attachment to a suspended conductor, said vibration damper including a damping structure, and said clamp comprising:
- a base having a housing for attachment to said damping structure and a first clamp member extending from said housing;
- a second clamp member, said first and second clamp members cooperating to provide a passageway for said suspended conductor, and one of said first and second clamp members having a first extension section and a second extension section; and
- an eyebolt for securing said second clamp member to said first clamp member, said first and second extension sections preventing rotation of said second clamp member about said eyebolt, and said eyebolt including:
  - a shaft having a first shaft end and a second shaft end;
  - a threaded portion located at said first shaft end configured for interconnection with said first and second clamp members; and
  - a loop portion located at said second shaft end for engagement with an installation tool for said vibration damper.

27. A clamp as claimed in claim 26 wherein said eyebolt further comprises a shoulder positioned between said threaded end and said loop portion of said shaft and oriented substantially perpendicular to said shaft.

28. A clamp as claimed in claim 27 wherein said eyebolt further comprises an elongate shaft section extending between said shoulder and said loop portion.

29. A clamp as claimed in claim 27 wherein said eyebolt further comprises a stop section extending between said threaded end and said shoulder.

30. A clamp as claimed in claim 26 wherein said installation tool has a hook member slidably mounted within a head of said installation tool for extension from and retraction into said head, and said loop portion is configured to be captured by said hook member and retracted into said head such that rotation of said installation tool causes rotation of said eyebolt.

* * * * *